(12) United States Patent
Archibald et al.

(10) Patent No.: US 9,309,136 B2
(45) Date of Patent: Apr. 12, 2016

(54) BIOREMEDIATION OF SOIL AND GROUNDWATER

(71) Applicants: John Archibald, Grimsby (CA); Gary M. Birk, Wake Forest, NC (US)

(72) Inventors: John Archibald, Grimsby (CA); Gary M. Birk, Wake Forest, NC (US)

(73) Assignee: Tersus Environmental, LLC, Wake Forest, NC (US)

( * ) Notice: Subject to any disclaimer, the term of this patent is extended or adjusted under 35 U.S.C. 154(b) by 13 days.

(21) Appl. No.: 14/120,646

(22) Filed: Jun. 12, 2014

(65) Prior Publication Data

US 2015/0360982 A1 Dec. 17, 2015

(51) Int. Cl.
*B09C 1/08* (2006.01)
*C02F 3/28* (2006.01)
*B09C 1/00* (2006.01)
*C02F 3/34* (2006.01)
*C02F 101/36* (2006.01)
*C02F 101/20* (2006.01)
*C02F 101/00* (2006.01)
*C02F 101/38* (2006.01)
*C02F 103/06* (2006.01)

(52) U.S. Cl.
CPC . *C02F 3/28* (2013.01); *B09C 1/002* (2013.01); *B09C 1/08* (2013.01); *C02F 3/34* (2013.01); *C02F 2101/003* (2013.01); *C02F 2101/006* (2013.01); *C02F 2101/20* (2013.01); *C02F 2101/36* (2013.01); *C02F 2101/38* (2013.01); *C02F 2103/06* (2013.01); *C02F 2303/26* (2013.01); *C02F 2305/04* (2013.01); *C02F 2305/06* (2013.01)

(58) Field of Classification Search
CPC ....................................................... B09C 1/08
See application file for complete search history.

(56) References Cited

U.S. PATENT DOCUMENTS 5,968,987 A * 10/1999 Charman ............. A61K 9/1075
514/656

* cited by examiner

*Primary Examiner* — Peter F Godenschwager
(74) *Attorney, Agent, or Firm* — George A. Seaby

(57) ABSTRACT

A composition for the bioremediation of soil or groundwater includes 35 to 60% by weight of an emulsifiable C4-C22 vegetable oil such as soybean or corn oil, about 60-35% by weight of a non-ionic surfactant/co-surfactant blend such as Tween 80®/Labrafil® mixed with Kolliphor EL®/Waglinol®, and about 0-12% by weight water.

9 Claims, No Drawings

BIOREMEDIATION OF SOIL AND GROUNDWATER

FIELD OF THE INVENTION

This invention relates to a composition and method for the bioremediation of soil and groundwater.

BACKGROUND OF THE INVENTION

Soil and groundwater contamination with man-made products presents a serious problem. Environmental contaminants must be managed to protect human health and the environment, and to restore aquifers to productive use. Typical groundwater contaminants include chlorinated halogenated straight-chain and aromatic hydrocarbons, perchlorate explosive materials such as aromatic nitrates, residues of energetic munitions, nitrates, acids, radionuclides and metal oxides.

Remediation of groundwater containing such contaminants can be effected using anaerobic bio-degradation processes in low permeability, saturated or variably saturated soils at a substantially lower cost than conventional methods. Anaerobic reducing conditions can be created by the addition of an organic substrate to an aquifer. The organic material initially consumes any oxygen or other electron acceptors such as nitrates ($NO_3$) or sulfates ($SO_4$), and then provides a carbon source and an electron donor for reductive chlorination. Interest has grown in the use of slow release electron donors in enhanced bioremediation (also referred to as biostimulation) systems for treating contaminants in groundwater. Emulsified vegetable oils have been used as carbon sources for enhanced halorespiration, which is the use of halogenated compounds as sources of energy. Halorespiration is also known as dehalorespiration and is a major form of anaerobic respiration which can play a part in microbial trichloroethene biodegradation. Common contaminants include chlorinated aliphatic compounds such as perchloroethene (PCE) and trichloroethene (TCE) and chlorinated phenols. Trichloroethene is the most common contaminant in groundwater.

Currently available electron donor compositions include emulsified vegetable oil (EVO) containing 25 to 50% water. These emulsified vegetable oils are inherently unstable and, thus, emulsions do not tend to form spontaneously. Energy input such as shaking, stirring or homogenizing is needed to form an emulsion. The compositions generally have a mean droplet size of one micron or greater. Over time, emulsions tend to revert to the stable state of the phases comprising the emulsion. The composition is purchased from a supplier and shipped to a contamination site. Typical dilution ratios range from one part EVO to four parts water to one part EVO to twenty parts water. Additional chase water is often added to aid with distribution. The cost of the electron donor may be a significant portion of the total process cost. The choosing of an efficient and low cost electron donor is important to the efficacy and overall economics of the bioremediation process.

Emulsions contain both a dispersed and a continuous phase. The boundary between the phases is called the interface. EVO composition providers with oil as the dispersed phase and water as the continuous phase include EOS Remediation, LLC, RNAS, Inc., and Terra Systems Inc./HePURE Technologies. The main ingredients of the products offered by the companies include, by weight, 45 to 60 percent refined, bleached and deodorized soybean oil, less than 10 percent food additives, emulsifiers, preservatives such as lethicin and 4 percent of a soluble substrate such as sodium or potassium lactate or lactic acid, with the balance being water.

A JRW composition (see U.S. Pat. No. 7,785,468) is a soy-based water in oil substrate. Water is the dispersed phase and oil as the continuous phase. The main ingredients of the composition are 45 percent soy-based oleaginous material, 35 percent ethyl acetate and 20 percent water. Other patents describing EVO compositions include U.S. Pat. No. 5,265,674 (Fredrickson et al), U.S. RE 40,448 and RE 40,734 (Borden et al) and U.S. Pat. No. 6,806,078 (Newman).

SUMMARY OF THE INVENTION

The present invention provides a method of in situ soil or groundwater remediation containing contaminants such as halogenated straight-chain or aromatic hydrocarbons, perchlorates, explosives such as aromatic nitrates, energetic munitions residues, acids, radionuclides or oxidized metals in which a self-nanoemulsifying composition is added to contaminated soil or an aquifer as an electron donor. The bioremediation method is preferably enhanced by adding hydrogen-enriched water or sugars, proteins, vitamins and amino acids contained in yeast cells and extracellular metabolites. The use of hydrogen-enriched water can reduce the demand for the electron donor over the life of a remediation project by as much as 50 percent. The dissolved gas enriched water is added to the emulsifiable oil as a dilution fluid, used as recirculation water or used a preconditioning water for a bioaugmentation culture.

DETAILED DESCRIPTION OF THE INVENTION

In greater detail, the self-nanoemulsifying composition (SNC) of the present invention is an isotropic mixture of emulsifiable C5-C22 vegetable oil selected from the group consisting of soybean oil, corn oil, coconut oil, rapeseed (canola) oil, peanut oil, sunflower oil, olive oil, crambe oil, and combinations thereof, and surfactants or one or more hydrophilic surfactant and co-surfactants that have a unique ability of forming fine oil-in-water (O/W) nano-emulsions when mixed with aqueous media under mild agitation. Spontaneous emulsification to produce a fine oil-in-water emulsion under gentle agitation followed by dilution in aqueous media can occur in an oil and surfactants mixture, if the entropy change favoring dispersion is larger than the energy required to increase the surface area of dispersion. Emulsification occurs spontaneously due to the low positive or negative free energy required to form the emulsion and produces extremely small droplet sizes, typically in the range of 20-200 nm.

In the following description and claims, all percentages are by weight.

The formulation of the present invention includes from about 35 to 60% of an emulsifiable C4-C22 vegetable oil selected from the group consisting of soybean oil, corn oil, coconut oil, rapeseed (canola) oil, peanut oil, sunflower oil, olive oil, crambe oil, and combinations thereof; about 60-35% of a non-ionic surfactant/co-surfactant blend to help to reduce the oil droplet size when compare to the use of a single surfactant and 0-12% water. Suitable surfactants include Tween 80® (polyoxyethylene sorbitan monooleate, Labrafil M1994CS® (oleyl polyoxyiglycerides), Cremophor EL® which is now called Colliphor EL® (polyoxyethylated castor oil), WAGLINOL 9238® (caprylic capric triglycerides) and CAPMUL® MCM series (glyceryl monocaprylocaprate) and mixtures thereof; and about 0-12% water. A suitable surfactant/co-surfactant blend includes Tween 80 (polyoxyethylene sorbitan monooleate)/Labrafil (oleyl polyoxylglycerides) in the ratio of 2:1 mixed with Cremophor EL (polyoxyl 35 castor oil)/Waglinol (caprylic capric triglycerides) in the ratio 1:2. This blend will produce a nanoemulsion with droplets sizes below 200 nm upon gentle agitation with water. Glycerol may also be used as a co-surfactant.

One preferred formulation for the bioremediation of soil and groundwater that spontaneously emulsifies upon addition of aqueous media to produce a water-in-oil-in-water (W/O/W) nanoemulsion comprises from about 35 to 45 percent of an emulsifiable C4-C22 vegetable oil, from about 8 to 12 percent water and from about 45 to 55 percent surfactants.

Other preferred formulations contain 35 to 45% by weight of the oil, 8 to 12% by weight water and one of (i) 30 to 40% by weight polyoxyethylene 20 sorbitan trioleate and 15% by weight caprylocaprolyl macrogol 8-glyceride, (ii) 30 to 40% by weight polyoxyethylene 20 sorbitan trioleate and 15% by weight polyoxy 30 castor oil, and 15% by weight polyoxyethylene 20 sorbitan trioleate and 30 to 40% by weight glycerol.

The droplet size of an emulsion is a critical factor in self-emulsifying composition performance and the small droplets size makes the emulsion kinetically stable against sedimentation or creaming for a long period of time. Common EVO formulations have droplets of approximately one micron or larger. Oil-in-water emulsions produced by field processing normally have median droplet sizes ranging from 2 to 10 microns. Oil droplets in coarse emulsions may remain dispersed in water for a few hours to a few days, but physical separation by "creaming" results if such emulsions are allowed to stand for longer periods of time. An emulsion with a median droplet size of 1 micron will take 100 times longer to separate than an oil/water emulsion with a median droplet size of 10 microns. As a general rule, emulsions that spontaneously form on contact with water are more stable than those that require energy inputs to form an emulsion. Self-nanoemulsifying compositions will not separate until the surfactants used to create them are destroyed by bacteria or other environmental factors. Field processed emulsions and some commercial products contain oil droplets larger than 1 micron and therefore are not kinetically stable. Oil droplets larger than one micron can coalesce into even larger droplets, leading to clogged pore throats or oil/water separation.

Droplet size is critical for transport of oil/water emulsions through porous media. The very small droplets and a very tight distribution of droplet size produced by an SNC allows injection into most soil and bedrock formations, because the emulsion will pass through the formation without straining of the oil droplets and the associated decrease in permeability. A tight droplet size distribution is also important since a few large droplets may block soil pores.

When diluted for injection, an SNC has a viscosity that is essentially the same as water. Hence, it disperses easily in water, pumps as easily as water, and moves through even fine-grained materials in a more predictable manner.

The addition of hydrogen-enriched water to the formulation enhances in situ bioremediation of groundwater which relies on microorganisms (soil bacteria). On a mass basis, 1 gram of molecular hydrogen is sufficient to dechlorinate 20.6 grams of perchloroethene (PCE), 21.7 grams of trichloroethene (TCE), 24.0 grams of dichloroethene (DCE) or 31 grams of polyvinyl chloride (PVC) to yield ethene, assuming 100 percent utilization of the molecular hydrogen by the dechlorinating microorganisms.

Competing electron acceptors may also be dissolved in the groundwater or present as solids. One gram of molecular hydrogen is also sufficient to reduce 7.9 grams of oxygen, 10.2 grams of nitrates, 55.9 grams of $Fe_3$ to $Fe_2$, 27.5 grams of $Mn_4$ to $Mn_3$, 10.6 grams of $SO_4$ or 5.5 grams of $CO_2$. The addition of hydrogen-enriched water can reduce the demand for the organic substrate (vegetable oil) by as much as 50 percent depending upon site conditions, minimize degradation of secondary water quality and adverse changes to aquifer pH and recirculate water to help improve the distribution of the oil and to precondition the water for the addition of bioaugmentation cultures. The addition of hydrogen-enriched water supersaturates a treatment well with dissolved hydrogen, typically 2-4 ppm. The hydrogen-enriched water disperses throughout the well into adjacent groundwater forming a large treatment zone and enhancing bioremediation.

The invention claimed is:

1. A formulation for the bioremediation of soil or groundwater comprising 35 to 60% of an emulsifiable C5-C22 vegetable oil selected from the group consisting of soybean oil, corn oil, coconut oil, canola oil, peanut oil, sunflower oil, olive oil, crambe oil, and mixtures thereof; and about 60-35% of a non-ionic surfactant/co-surfactant blend consisting of polyoxyethylene sorbitan monooleate/oleyl polyoxyglycerides in a ratio of 2:1 mixed with polyoxyethylated castor oil/caprylic capric triglycerides in a ratio of 1:2.

2. A formulation for the bioremediation of soil or groundwater comprising 35 to 45% by weight of an emulsifiable C4-C22 vegetable oil selected from the group consisting of soybean oil, corn oil, coconut oil, canola oil, peanut oil, sunflower oil, olive oil, crambe oil, and mixtures thereof; from about 45 to 55% by weight of a surfactant/co-surfactant mixture selected from the group consisting of polyoxyethylene 20 sorbitan trioleate/caprylocaproyl macrogol-8-glyceride, polyoxyethylene 20 sorbitan trioleate/polyoxyl 35 castor oil and polyoxylethylene 20 sorbitan trioleate/glycerol and 8 to 12% by weight water.

3. The formulation of claim 2, comprising 35-45% by weight of the oil, 30 to 40% by weight polyoxyethylene 20 sorbitan trioleate, 15% by weight caprylocaproyl macrogol-8-glyceride and 8 to 12% by weight water.

4. The formulation of claim 3, wherein the water is hydrogen enriched.

5. The formulation of claim 2 comprising 35 to 45% by weight of the oil, 30 to 40% by weight polyoxyethylene 20 sorbitan trioleate, 15% by weight polyoxyl 35 castor oil and 8 to 12% by weight water.

6. The formulation of claim 5, wherein the water is hydrogen enriched.

7. The formulation of claim 2 comprising 35 to 45% by weight of the oil, 15% by weight polyoxyethylene 20 sorbitan trioleate, 30 to 40% by weight glycerol and 8-12% by weight water.

8. The formulation of claim 7, wherein the water is hydrogen enriched.

9. The formulation of claim 2, wherein the water is hydrogen enriched.

* * * * *